Nov. 13, 1934.  D. F. NEWMAN  1,980,286
PROJECTION SCREEN
Filed May 13, 1930
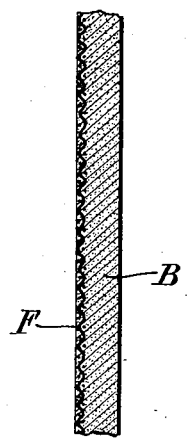
INVENTOR
David F. Newman
BY
Ward, Crosby & Neal
ATTORNEYS Patented Nov. 13, 1934

1,980,286

UNITED STATES PATENT OFFICE 1,980,286

PROJECTION SCREEN

David F. Newman, Freeport, N. Y., assignor to Trans-Lux Daylight Picture Screen Corporation, New York, N. Y., a corporation of Delaware Application May 13, 1930, Serial No. 452,133

5 Claims. (Cl. 88—24)

My invention relates to a projection screen.

My invention, in one of its prominent phases, relates to a screen formed from viscous screen-forming material which has a light-diffusing agent associated therewith or incorporated therein.

Further objects, advantages and characteristics of my invention will become apparent from the following detailed description.

My invention resides in the projection screen and features of the character hereinafter described and claimed.

On the drawing, the figure is a fragmentary sectional view showing the screen of my invention.

A screen constructed in accordance with my invention is disposed, usually, substantially vertically between an audience and suitable projection mechanism from which emanates a beam of light passing to the eyes of an audience after traversing said screen. The aforesaid projection mechanism may be such as is coactable with suitable motion picture film bearing representations or pictures through which passes the aforesaid beam of light to effect the display of images of said representations or pictures on said screen.

A screen utilizable as above may, in accordance with my invention, be constructed in a variety of ways. As shown on the drawing, the screen comprises a base B which, in turn, comprises one or more materials or substances utilizable as the screen body. With such materials or substances, there may be utilized (1) an agent having germicidal, bacteriacidal, fungicidal and/or preservative qualities or characteristics, an agent of the character just specified being hereinafter generically termed a "germicidal" agent, and (2) a light-filtering agent, a curing agent also being associated with the aforesaid material or materials when desired although the use of the last named agent may not be necessary.

In accordance with my invention, with the chosen screen-forming material or materials, there is associated a light-diffusing agent having the property of causing the completed screen to properly and adequately diffuse the projected light. In accordance with a more specific form of my invention, said light-diffusing agent may also serve as a curing agent, in which case a separate curing agent may not be required.

To form the screen body, it has been demonstrated that gelatine and glycerine taken with the proper amount of a suitable liquid, as water, are satisfactory, the water being filtered or distilled when necessary. In generally, substantially equal amounts of the gelatine and glycerine may be utilized; the amount of water depends upon the condition and character of the various agents, particularly the gelatine, but usually, an amount of water substantially greater than the amount of either the gelatine or glycerine is required. The gelatine should be substantially neutral and may be obtained from glue in turn obtained from materials of any suitable character. Or, ordinary glue may be utilized. In lieu of the glycerine there may be utilized suitable other material, as ethylene-glycol or di-ethylene-glycol.

To render the completed screen suitably resistant to the action of germs, bacteria or fungi and/or to preserve the same, a suitable germicidal agent, such as sodium fluoride, may be employed. Ordinarily, a small quantity of such material suffices, the amount thereof usually being much less than that of the aforesaid body materials. In lieu of sodium fluoride, there may be utilized suitable other substances or agents, as boric acid, sodium salicylate, many forms of phenol, etc.

In order to reproduce upon the screen with a satisfactory degree of faithfulness the color values in the field being projected, I find it desirable to so construct the screen that it will be neutral or nearly so when acted upon by the light from the projector and, inasmuch as this light usually contains an excess of yellow rays, a filtering agent may be employed to obtain the proper screen effect. Without this filtering agent, for example, white on the screen appears as a tan color, and other colors are affected correspondingly. Obviously, the character of the source of light is largely controlling, but, in general, only a small amount of the light-filtering agent is required in comparison to the amount of the materials comprised in the screen body. It has been demonstrated that cobalt blue (oxides of cobalt and aluminum) is satisfactory for light-filtering purposes. Similarly, the analine dyes, specifically analine blue, may be utilized, if desired.

To facilitate, modify or control the rate at which the screen or screen materials approaches or approach final or permanent state, it may be desirable to employ a curing agent or material, the primary function of which is to harden, dry, fix or preserve the screen-forming material or a component thereof. Any suitable material may be employed for this purpose, the amount depending upon many factors, such as the general atmospheric conditions that obtain in the locality where the screen is to be used, the time available between manufacture and use of the screen, the desired character of the screen when completed, etc. In general, a very small amount of the curing agent is required in comparison to the amount of materials comprised in the screen body. Formaldehyde functions very satisfactorily as a curing agent, and so do other members of the aldehyde group such, for example, as acrylic aldehyde, acetic aldehyde, or the like. Formaldehyde and other members of the aldehyde group decrease the screen flexibility. If this is not desired, a copper salt, as cupric sulphate, may be utilized, material of the character last named being ineffective to substantially decrease the screen flexibility.

As hereinbefore stated, there is utilized a light-diffusing agent, and, in accordance with my invention, said light-diffusing agent is of inorganic character. For this purpose, many suitable materials are satisfactory, such, for example, as zinc oxide, barium sulphate, antimony oxide, zinc sulphide, silica, ground glass, etc. The aforesaid light-diffusing agent utilized as a single material, or as a combination, in suitable ratio, of a plurality of materials, governs the degree of translucency or light transmission factor or characteristic of the completed screen. Zinc oxide, barium sulphate and antimony oxide function secondarily as curing agents in addition to their primary function as light-diffusing agents. Because thus functioning as a curing agent, the zinc oxide, or equivalent, serves to harden, dry or fix the gelatinous material and, accordingly, it may be unnecessary to utilize another curing agent, or the latter may be utilized to less extent than would be the case if an organic light-diffusing agent, such, for example, as casein were employed.

When the screen is to be employed for exhibition of motion pictures, for example, I have ascertained that an inorganic light-diffusing agent, in comparison with an organic light-diffusing agent, gives a better screen effect because substantially or largely overcoming the "lens spot" effect. Then, too, the inorganic light-diffusing agent may serve as a curing agent as stated, and, in normal state, is in proper condition to be associated with the other screen-forming materials whereas the latter is not always true of such an organic light-diffusing agent as casein.

Merely by way of one example of my invention and for purposes of explanation, a satisfactory formula is herewith stated qualitatively and quantitatively as follows:

|  |  | Grams |
|---|---|---|
| Body | Gelatine | 450 |
|  | Glycerine | 570 |
|  | Water (more or less) | 900 |
| Germicidal agent: sodium fluoride |  | 25 |
| Light-filtering agent: cobalt blue |  | 6 |
| Light-diffusing agent: zinc oxide |  | 20 |

These materials, proportioned as noted above or otherwise as may be desirable, may be mixed and brought to a homogeneous semi-fluid or viscous condition in any suitable manner. For example, all may be mixed together and then elevated in temperature, preferably gradually, until a temperature well above room temperature is reached, such, for example, as within the range of 130° F. to 170° F., more or less. During the continued application of heat, the mass of material should be slowly stirred until and after all of the ingredients have been formed into a homogeneous mass.

A more preferable way, however, involves separate treatment of some of the materials. To this end, the gelatine may be soaked with some of the water for an extended period, for example, from 4 to 10 hours, more or less. Thereafter, the partly mixed gelatine and water should be heated slowly and slowly stirred until a viscous condition is produced.

At this time, one or more of the other ingredients or materials may be added. This holds true for the glycerine, the zinc oxide and the sodium fluoride. Preferably, the zinc oxide and the sodium fluoride are first mixed separately with some of the water. The sodium fluoride may be added at this time, but preferably it is placed with the water and gelatine when the latter is allowed to soak.

During continued application of heat within substantially the limits above noted, the mixture should be stirred until the mass has become homogeneous. Thereafter, the mixture should be strained to remove all possible extraneous matter.

After the mixture has been mixed and strained as just noted and while its temperature is approximately of the order stated, the cobalt blue may be added. Preferably, a small part of the glycerine is placed aside and, with this, the cobalt blue is mixed prior to addition thereof to the aforesaid strained mixture.

If formaldehyde is employed as a curing agent, it preferably is added last, the amount thereof being such as is suitable; with the formula above stated, 14 grams of a 10% solution of formaldehyde may be utilized. Or, as hereinafter described, formaldehyde may be applied during or after the molding operation. Further, in lieu of formaldehyde, cupric sulphate, or equivalent, may be added to the other materials, the amount thereof being such as is suitable; for example, one gram may be utilized with the formula hereinbefore stated. Or, if desired, a curing agent per se may be entirely dispensed with.

In lieu of the materials specifically named above, it shall be understood that other equivalent materials may be utilized as desired, various examples of such equivalents having been hereinbefore stated.

After the aforesaid ingredients have been mixed thoroughly, the resultant mixture is suitably molded to produce the screen which, ordinarily, is plane and sheet-like in character, the thickness thereof being as desired and preferably small, as of the order of $\frac{1}{32}$, $\frac{1}{16}$, or $\frac{1}{8}$ of an inch, more or less.

When a screen of the character last described is to be produced, there may be employed, for the molding operation, a suitable matrix table embodying a plane surface of suitable material and extent or area for the reception of the aforesaid mixture. The surface of the table should be bordered by a retaining wall of a height substantially equal to the thickness of the screen to be produced, and said table should be heated to suitable extent, preferably within a range somewhat below the temperature of the aforesaid mixture.

After the matrix table has been brought to suitable temperature conditions and with the aforesaid mixture in proper condition, the latter should be poured on or applied to the table, preferably until it slightly overflows the bordering wall thereof. The excess material should now be removed, as by a straight edge.

Preferably, although not necessarily, suitable fabric material F is incorporated in or with the viscous material on the matrix table at this stage of the operation. Such material, for example, may be a sheet of georgette silk from which all of the foreign matter such as gums, resins, etc., has been suitably removed. Previously, the silk sheet should have been stretched on a frame having an opening of such extent that it suitably fits around the aforesaid bordering wall of the matrix table.

After the excess material has been removed as stated above, the sheet of silk is suitably lowered toward and into engagement with the upper surface of the material on the matrix table, care being taken to avoid entrapment of air between the silk sheet and the viscous material. In so doing, the frame holding the silk sheet comes into position around the bordering wall of the matrix table, and thereupon the silk sheet sinks into or amalgamates with said viscous material. At this time, application of heat to the matrix table should be discontinued, and after a suitable cooling period, as two or three hours, has elapsed, a knife should be passed between the frame holding the silk sheet and the bordering wall of the table to sever said sheet from its frame. Thereupon, the molded screen may be removed from the matrix table in any suitable manner.

Thereafter, the edges of the screen should be suitably bound, as by canvas, or equivalent, strips adhesively secured thereto and provided with eyelets. When the screen is installed for use, a suitable frame should be provided and the screen positioned tautly therein, as by rope passing through the eyelets and engaging the frame.

When a curing agent, such as formaldehyde or a member of the aldehyde group, is utilized in addition to the aforesaid light-diffusing agent, said curing agent, in accordance with a phase of my invention, may be applied after the screen has been brought to sheet-like configuration such as exists, for example, when the screen material is on the matrix table, the curing agent being suitably applied at this time, as by a spraying device. Or, application of the curing agent or material may be deferred until the molding operation is complete, or if desired until after the screen has been removed from the matrix table.

The strength of the curing agent or material, when utilized, primarily determines the rapidity with which the screen approaches its completed condition. Where time is essential, the strength may be relatively high, but otherwise the strength may be less. Where a screen is to be transported a great distance to the place of installation, the curing process may be effected while the screen is en route and the strength of the curing material may be such that the curing process is completed at about the time the screen reaches its destination, or, if desired, said curing agent may be applied after the screen reaches its destination.

Under some circumstances, it may be desirable to suitably mark, groove, or etch the surface of the matrix table to thereby produce similar markings, grooves or etchings on the screen. These, of course, may assume any of a great number of selected designs.

As hereinbefore stated, the screen thus specifically described is adapted for "rear" projection. Under such circumstances, the amount of the light-diffusing agent, whether zinc oxide or other equivalent material, should be of the order specified or substantially less than the amounts of the body material.

Ordinarily, a screen adapted for "rear" projection is not suitable for "front" projection, i. e., the type wherein the projecting mechanism and the audience are on the same side of the screen, the light being reflected to the audience by the screen. However, in accordance with one form of my invention, the amount of the light-diffusing agent may be greatly or substantially increased, while maintaining the remaining formula ratio substantially as stated, if desired, to thereby produce a screen adapted and utilizable for "front" projection, the degree of opacity desired generally governing the amount of said light-diffusing agent to be utilized.

While the invention has been described with respect to a certain particular preferred example which gives satisfactory results, it will be understood by those skilled in the art after understanding the invention, that various changes and modifications may be made without departing from the spirit and scope of the invention, and it is intended, therefore, in the appended claims to cover all such changes and modifications.

What is claimed as new and desired to be secured by Letters Patent is:

1. A projection screen comprising a body including gelatinous material, glycerine and a liquid principally, and material having combined light-diffusing and screen-curing properties incorporated in said body.

2. A projection screen comprising a body including gelatinous material, glycerine, a liquid, a light-filtering agent, and zinc oxide.

3. A projection screen comprising a body including gelatinous material, glycerine, a liquid, zinc oxide, cobalt blue, and sodium fluoride.

4. A projection screen comprising a body including gelatinous material, glycerine and a liquid principally, material having combined light-diffusing and screen-curing properties incorporated in said body, and a separate curing agent associated with said body.

5. A projection screen comprising a body including gelatinous material, glycerine, a liquid, and zinc oxide.

DAVID F. NEWMAN.